Figure 1:
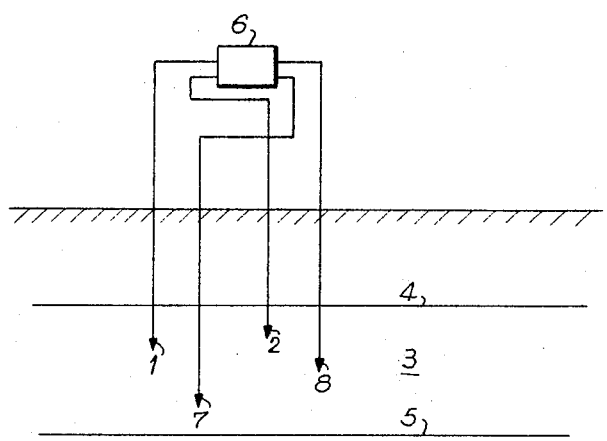

Nov. 1, 1966   J. M. LOEB   3,283,250
ELECTROMAGNETIC TRANSMISSION SYSTEMS OPERATING
BELOW GROUND SURFACE
Filed March 20, 1963

United States Patent Office 3,283,250
Patented Nov. 1, 1966

3,283,250
ELECTROMAGNETIC TRANSMISSION SYSTEMS OPERATING BELOW GROUND SURFACE
Julien M. Loeb, Saint-Cloud, France, assignor to Compagnie Generale de Geophysique, Paris, France, a corporation of France
Filed Mar. 20, 1963, Ser. No. 266,728
Claims priority, application France, Apr. 19, 1962, 895,011
4 Claims. (Cl. 325—28)

This invention relates to electromagnetic systems operating below ground.

Experience has shown that it is possible to transmit, below ground surface and under certain circumstances, electromagnetic waves over a substantial distance.

This is in particular the case when the ground includes a stratified layer having a comparatively large resistivity bounded along its upper and lower surfaces by layers having a higher conductivity.

As a matter of fact, in such a case, the layer having a comparatively large resistivity acts in the manner of a wave guide due to the fact that it is bounded between two comparatively conductive layers.

When it is desired to transmit signals under such conditions, it is sufficient to provide a bore hole in the ground and to introduce at two suitably spaced points of the bore hole, two electrodes which are caused to sink into registry with said layer having a large resistivity.

A voltage of a suitable frequency, preferably a very low frequency, fed across said transmitting electrodes by a generator of any suitable type, produces in said layer electromagnetic waves which may be collected at a comparatively large distance by means of two receiving electrodes similar to the transmitting electrodes and arranged at a distance from each other which is small compared with the distance separating the transmitting electrodes from the receiving electrodes.

The electromagnetic waves produced in the ground by the voltage applied across the transmitting electrodes induce between the receiving electrodes a voltage of the same frequency, which forms the received signal and which is amplified and used in any desired manner.

Such a transmission provides the considerable advantage of substantially complete secrecy and is practically undisturbed by the jamming waves produced by fortuitous strays or by purposely generated interfering waves.

However, the range of transmissions of this type is not generally sufficient to allow its use on a large scale.

The present invention has as an object the provision of an intermediate relay which allows increasing practically to any desired extent the range of the transmission.

Such a relay includes two receiving electrodes connected across the input of an amplifier, the output of which is adapted to feed two transmitting relay electrodes.

However, it is not possible merely to reinject into the ground the waves received when amplified even after a change of frequency, through the agency of these transmitting relay electrodes which are independent of the receiving electrodes since this would lead to a feed-back coupling between the input and output voltages of the amplifier and this coupling would lead to oscillations which result in cutting out any possibility of using such an amplifying system.

According to the invention, it is possible to resort to such amplifying relays by suitably selecting the location of the electrodes associated with the relay in a manner such that the voltages reinjected into the ground by said relay amplifier cannot react on the voltage collected by the input electrodes.

To this end and in accordance with the invention, the position of the receiving electrodes of the relay is defined after that of the re-transmitting electrodes has been chosen and this position of the receiving electrodes is selected in a manner such that said two receiving electrodes connected across the input of the amplifying relay are located on a same equipotential surface of the field produced by the retransmitting electrodes fed by said amplifier.

Figure 2:
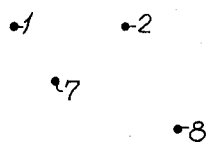

The accompanying drawing illustrates diagrammatically an embodiment of the invention. In said drawings:

FIG. 1 is a vertical sectional view of the electrodes and FIG. 2 is a plan view thereof.

In the drawing, elements 1 and 2 are the two receiving electrodes arranged at a predetermined distance from each other inside a layer 3 providing for the transmission of the waves, said layer being bounded along its upper and lower surfaces by two comparatively conductive layers 4 and 5.

Said two electrodes are connected with the input of an amplifying relay 6, while two retransmitting electrodes 7 and 8 are also located inside the layer 3 and are connected with the output of said relay 6.

According to the invention, the position of the output electrodes 7 and 8 is first defined, after which that of the input electrodes 1 and 2 is defined in its turn so that they are located on a same equipotential surface of the field produced by the voltage applied across the electrodes 7 and 8.

It will be remarked that such an amplifying relay has no directional property and may serve for amplifying waves in either direction.

The condition required for locating the electrodes 1 and 2 provides obviously a great freedom in the positioning of said electrodes, so that they may not be actually located on an equipotential surface of the field produced by the incoming waves to be amplified.

It will also be remarked that in the case where the transmission is performed through impulses, the relay 6 may also be provided with means for reshaping the impulses.

It is not necessary in the application of the invention for the layer of ground serving for the transmission to be homogeneous and it is sufficient for the equipotential surfaces of said layer not to vary with time.

What I claim is:
1. A method for improving the operation of an electromagnetic system adapted for transmitting electromagnetic waves through a layer of ground from a transmitting zone to a receiving zone, said method comprising interposing between said zones an amplifier having input and output terminals to which are respectively connected receiving and retransmitting electrodes, and positioning the receiving electrodes on a common equipotential surface of the field produced by the retransmitting electrodes when the latter are operative.

2. A method as claimed in claim 1 wherein the electrodes are positioned in said layer.

3. A method as claimed in claim 2 wherein the amplifier is positioned above ground.

4. A method as claimed in claim 2 wherein the retransmitting electrodes are positioned prior to the receiving electrodes.

References Cited by the Examiner

UNITED STATES PATENTS

| | | | |
|---|---|---|---|
| 2,499,195 | 2/1950 | McNiven | 325—28 |
| 2,653,220 | 9/1953 | Bays | 325—28 |
| 2,998,516 | 8/1961 | Lehan et al. | 325—28 |

DAVID G. REDINBAUGH, *Primary Examiner.*

J. W. CALDWELL, *Assistant Examiner.*